United States Patent
Kim et al.

(10) Patent No.: US 11,375,265 B2
(45) Date of Patent: Jun. 28, 2022

(54) ELECTRONIC APPARATUS AND CONTROLLING METHOD THEREOF

(71) Applicant: SAMSUNG ELECTRONICS CO., LTD., Suwon-si (KR)

(72) Inventors: Hanki Kim, Suwon-si (KR);
Haekwang Park, Suwon-si (KR);
Woojung Lee, Suwon-si (KR);
Youngsuk Song, Suwon-si (KR);
Junhyuk Im, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/081,100

(22) Filed: Oct. 27, 2020

(65) Prior Publication Data

US 2021/0168430 A1 Jun. 3, 2021

(30) Foreign Application Priority Data

Dec. 2, 2019 (KR) .................. 10-2019-0158610

(51) Int. Cl.
*H04N 21/43* (2011.01)
*H04N 21/439* (2011.01)
(Continued)

(52) U.S. Cl.
CPC ..... *H04N 21/4307* (2013.01); *H04N 21/4398* (2013.01); *H04R 5/04* (2013.01); *H04S 7/301* (2013.01); *H04S 2420/01* (2013.01)

(58) Field of Classification Search
USPC .......... 348/515, 516, 521, 522, 569
See application file for complete search history.

(56) References Cited

U.S. PATENT DOCUMENTS

| 8,120,713 B2 | 2/2012 | Sakata et al. |
| 10,349,123 B2 | 7/2019 | Panger et al. |

(Continued)

FOREIGN PATENT DOCUMENTS

| EP | 2 385 686 A1 | 11/2011 |
| EP | 2 629 552 A1 | 8/2013 |

(Continued)

OTHER PUBLICATIONS

International Search Report (PCT/ISA/210) issued by the International Searching Authority in International Application No. PCT/KR2020/015938, dated Feb. 22, 2021.

(Continued)

*Primary Examiner* — Yosef K Laekemariam
(74) *Attorney, Agent, or Firm* — Sughrue Mion, PLLC

(57) ABSTRACT

An electronic apparatus is provided. The electronic apparatus includes a communication interface; a display; an internal speaker; and a processor configured to control the internal speaker to generate a first audio signal and control the communication interface to transmit a signal to control an external audio device to generate a second audio signal that is synchronized with the first audio signal. The processor is configured to: obtain a first processing time regarding the first audio signal and a second processing time regarding the second audio signal; and control the internal speaker and the communication interface based on the first processing time and the second processing time so that a difference between a first output timing of the first audio signal and a second output timing of the second audio signal is less than a predetermined value.

20 Claims, 10 Drawing Sheets

(51) Int. Cl.
*H04R 5/04* (2006.01)
*H04S 7/00* (2006.01)

(56) References Cited

U.S. PATENT DOCUMENTS

| | | | |
|---|---|---|---|
| 10,349,171 B2 | 7/2019 | Yoon et al. | |
| 10,474,424 B2 | 11/2019 | Tanaka et al. | |
| 2005/0058304 A1 | 3/2005 | Baumgarte et al. | |
| 2012/0087503 A1 | 4/2012 | Watson et al. | |
| 2013/0272097 A1* | 10/2013 | Kim | G10L 17/00 |
| | | | 367/129 |
| 2017/0318197 A1* | 11/2017 | Lee | H04N 5/05 |

FOREIGN PATENT DOCUMENTS

| | | |
|---|---|---|
| EP | 2 648 111 A1 | 10/2013 |
| JP | 2011-130236 A | 6/2011 |
| JP | 6451596 B2 | 1/2019 |
| JP | 2019-532576 A | 11/2019 |
| KR | 10-0677971 B1 | 2/2007 |
| KR | 10-2011-0120402 A | 11/2011 |
| KR | 10-2012-0074700 A | 7/2012 |
| KR | 10-1238368 B1 | 2/2013 |
| KR | 10-1672051 B1 | 11/2016 |
| KR | 10-2016-0147556 A | 12/2016 |
| KR | 10-2019-0056060 A | 5/2019 |
| WO | 2015/147433 A1 | 10/2015 |
| WO | 2015/174753 A1 | 11/2015 |
| WO | WO 2015/174753  * 11/2015 ............... H04R 5/02 |
| WO | 2016/018787 A1 | 2/2016 |
| WO | 2018/052881 A1 | 3/2018 |

OTHER PUBLICATIONS

Written Opinion (PCT/ISA/237) issued by the International Searching Authority in International Application No. PCT/KR2020/015938, dated Feb. 22, 2021.
Communication dated Mar. 9, 2021, from the European Patent Office in European Application No. 20202917.9.

* cited by examiner

ELECTRONIC APPARATUS AND CONTROLLING METHOD THEREOF

CROSS-REFERENCE TO RELATED APPLICATION(S)

This application is based on and claims priority under 35 U.S.C. § 119 to Korean Patent Application No. 10-2019-0158610, filed on Dec. 2, 2019, in the Korean Intellectual Property Office, the disclosure of which is incorporated by reference herein in its entirety.

BACKGROUND

1. Field

The disclosure relates to an electronic apparatus and a controlling method thereof, and more particularly to an electronic apparatus that is synchronized with an audio device and outputs an audio signal and a controlling method thereof.

2. Description of Related Art

Recently, with the development of audio technology, consumers increasingly want to experience a wide sound stage through an audio device (e.g., a sound bar and an external speaker) connected to a TV.

When sound is output simultaneously from a speaker built in the TV and an outside external device, due to the difference in the audio signal processing time between the TV and the external audio device, there is a problem in synchronization because the sound output from the speaker built in the TV and the sound output from the external audio device do not match.

Accordingly, there is a need for an electronic apparatus that can output sound in synchronization with an audio device.

SUMMARY

One or more embodiments provide an electronic apparatus that can be synchronized with an external audio device and output an audio signal.

Embodiments of the disclosure overcome the above disadvantages and other disadvantages not described above. In addition, the disclosure is not required to overcome the disadvantages described above, and an embodiment of the disclosure may not overcome any of the problems described above.

In accordance with an aspect of the disclosure an electronic apparatus includes: a communication interface; a display; an internal speaker; and a processor configured to control the internal speaker to generate a first audio signal and control the communication interface to transmit a signal to an external audio device to control the external audio device to generate a second audio signal that is synchronized with the first audio signal. The processor is further configured to: obtain a first processing time regarding the first audio signal and a second processing time regarding the second audio signal; and control the internal speaker and the communication interface based on the first processing time and the second processing time so that a difference between a first output timing of the first audio signal and a second output timing of the second audio signal is less than a predetermined value.

The first audio signal and the second audio signal may be provided from a common source.

The processor may be further configured to generate a second audio source of the second audio signal by decoding a first audio source of the first audio signal.

The processor may be further configured to generate a second audio source of the second audio signal by rendering a first audio source of the first audio signal.

A second audio source of the second audio signal may include a frequency component that is not provided in the first audio signal.

The processor may be further configured to obtain the first processing time based on an input format of a first audio source corresponding to the first audio signal from the external audio device through the communication interface.

The processor may be further configured to obtain model information of the external audio device from the external audio device through the communication interface, and obtain the second processing time based on the model information.

The processor may be further configured to: obtain a difference value between the first processing time and the second processing time; based on the difference value being greater than the predetermined value, obtain a delay time based on the first processing time and the second processing time; and control output of the internal speaker or control the communication interface to transmit the signal to the external audio device so that the first audio signal or the second audio signal is offset based on the delay time.

The processor may be configured to, based on the first processing time being less than the second processing time, control output of the internal speaker so that the first audio signal is offset by the delay time so that the first audio signal is output later than a first predetermined time.

The processor may be configured to, based on the first processing time being greater than the second processing time, control the communication interface to transmit the signal for controlling the second audio signal to be offset by the delay time so that the second audio signal is output later than a second predetermined time, to the external audio device.

In accordance with an aspect of the disclosure a method of controlling an electronic apparatus that has an internal speaker and a communication interface connected to an external audio device is provided. The method includes: obtaining a first processing time regarding a first audio signal output from the internal speaker and a second processing time regarding a second audio signal output from the external audio device; and control the internal speaker and the communication interface based on the first processing time and the second processing time so that a difference between a first output timing of the first audio signal and a second output timing of the second audio signal is less than a predetermined value.

The obtaining the first processing time and the second processing time may include: obtaining the first processing time based on an input format of a first audio source corresponding to the first audio signal from the external audio device.

The obtaining the first processing time and the second processing time may include: obtaining model information of the external audio device from the external audio device; and obtaining the second processing time based on the obtained model information.

The method may further include: obtaining a difference value between the first processing time and the second processing time; based on the difference value being greater than the predetermined value, obtaining a delay time based on the first processing time and the second processing time; and based on the first processing time being less than the second processing time, controlling output of the internal speaker so that the first audio signal is offset based on the obtained delay time.

The first audio signal and the second audio signal may be provided from a common source.

A second audio source of the second audio signal may include a frequency component that is not provided in the first audio signal.

In accordance with an aspect of the disclosure an audio system includes: a first electronic apparatus comprising a display, a first communication interface, a first memory, and a first speaker; a second electronic apparatus comprising a second communication interface, a second memory and a second speaker; and a processor configured to control the first electronic apparatus and the second electronic apparatus to output an audio signal. The processor is configured to: obtain a first processing time of the first electronic apparatus based on first model information of the first electronic apparatus stored in the first memory; obtain a second processing time of the second electronic apparatus based on second model information of the second electronic apparatus stored in the second memory; and based on a difference between the first processing time and the second processing time being greater than a predetermined value, obtain a delay time based on the first processing time and the processing second time, and control at least one of the first electronic apparatus or the second electronic apparatus based on the delay time.

The processor may be configured to: control a first audio signal output through the first speaker so that the first audio signal is offset by the delay time, based on the first processing time being less than the second processing time; and control a second audio signal output through the second speaker so that the second audio signal is offset by the delay time, based on the first processing time being greater than the second processing time.

In accordance with an aspect of the disclosure an apparatus includes: a first communication interface; a second communication interface; and a processor configured to: obtain a first processing time corresponding to a first audio signal output through the first communication interface; obtain a second processing time corresponding to a second audio signal output through the second communication interface; identify whether a difference between the first processing time and the second processing time is greater than a threshold value; and delay one from among the first audio signal and the second audio signal based on the difference being greater than the threshold value.

The processor may be further configured to obtain generate a first audio source and a second audio source based on an input audio source; provide the first audio source to a first device through the first communication interface; provide the second audio source to a second device through the second communication interface; obtain first model information of the first device and second model information of the second device; obtain the first processing time based on a format of the input audio source and first model information corresponding to the first device; and obtain the second processing time based on the format of the input audio source and second model information corresponding to the second device.

According to embodiments, an external audio device and an electronic apparatus may be synchronized with each other to output sound and thus, a user may experience a wider sound stage. Therefore, user convenience and satisfaction can be improved.

Additional and/or other aspects and advantages of the disclosure are set forth in part in the description which follows and, in part, are obvious from the description, or may be learned by practice of the disclosure.

BRIEF DESCRIPTION OF THE DRAWINGS

The above and/or other aspects, features and advantages of certain embodiments of the disclosure will be more apparent from the following description taken in conjunction with the accompanying drawings, in which.

DETAILED DESCRIPTION

Figure 1:
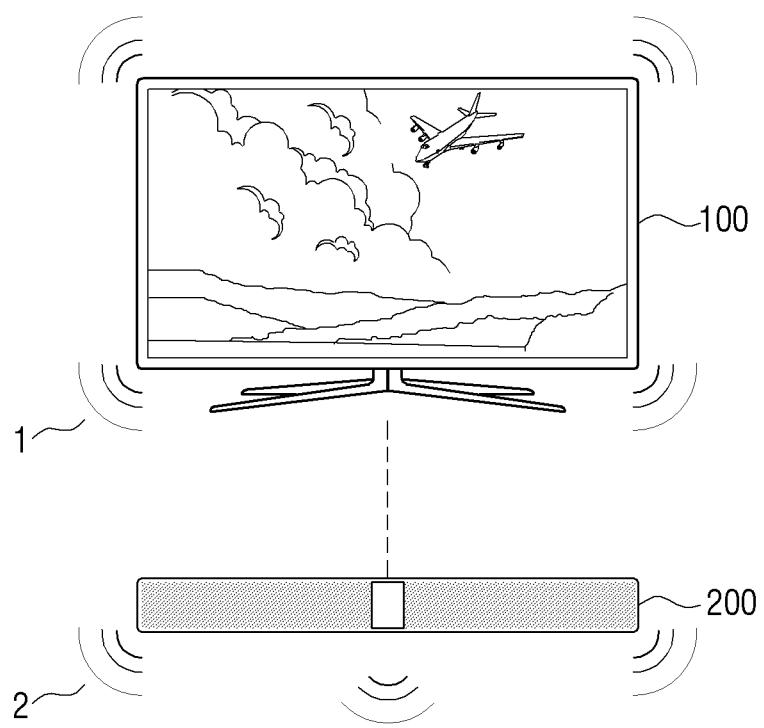
FIG. 1 is a view provided to explain operation of an electronic apparatus according to an embodiment.

Hereinafter, embodiments of the disclosure will be described in detail with reference to the accompanying drawings. It is understood, however, that the disclosure is not limited to embodiments described herein.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

As used herein, terms the terms "1st" or "first" and "second" or "2nd" may use corresponding components regardless of importance or order and are used to distinguish one component from another without limiting the components. For example, a "first" component may be named a "second" component and the "second" component may also be similarly named the "first" component, without departing from the scope of the disclosure.

Singular forms used herein are intended to include plural forms unless explicitly indicated otherwise. It is to understood that terms "comprise" or "include" specify the presence of features, numerals, steps, operations, components, parts mentioned in the present specification or combinations thereof, but do not preclude the presence or addition of one or more other features, numerals, steps, operations, components, parts or combinations thereof.

In the drawings, portions unrelated to the description may be omitted and similar portions are denoted by similar reference numerals throughout the specification.

FIG. 1 is a view provided to explain operation of an electronic apparatus according to an embodiment.

An electronic apparatus 100 and an external audio device 200 may output an audio signal, respectively. For example, each of the electronic apparatus 100 and the external audio device 200 may concurrently output audio regarding the same content. In this case, the electronic apparatus 100 may be synchronized with the external audio device 200 and output an audio signal. Specifically, the electronic apparatus 100 may control output of a first audio signal 1 so that the first audio signal 1 output from the electronic apparatus 100 is synchronized with a second audio signal 2 output from the external audio device 200. Alternatively, the electronic apparatus 100 may output the first audio signal 1 and transmit a signal to the audio device 200 so that the external audio device 200 synchronizes the second audio signal 2 with the first audio signal 1. Here, the first audio signal 1 and the second audio signal 2 may be audio signals regarding the same content.

The electronic apparatus 100 may control output of the first audio signal 1 so that a first output timing of the first audio signal 1 and a second output timing of the second audio signal are synchronized with each other. For example, if the first output timing of the first audio signal 1 precedes the second output timing of the second audio signal 2 by more than a predetermined time, the electronic apparatus 100 may control output of a speaker included in the electronic apparatus 100 so that output of the first audio signal 1 is delayed based on a time difference between the first output timing and the second output timing. Accordingly, the first audio signal 1 and the second audio signal 2 may be output within a predetermined time range (i.e., synchronized). Here, the predetermined time may correspond to a time when a user does not recognize a time difference between the first output timing of the first audio signal 1 and the second output timing of the second audio signal 2. For example, the predetermined time may be set to 10 milliseconds (ms) or less. For example, the predetermined time may be controlled through a user interface provided on the electronic apparatus 100.

In addition, the electronic apparatus 100 may control output of the first audio signal 1 so that a first output level of the first audio signal 1 and a second output level of the second audio signal 2 correspond to each other. For example, if the first output level of the first audio signal 1 is lower than the second output level of the second audio signal 2 by more than a predetermined level, the electronic apparatus 100 may control output of a speaker included in the electronic apparatus 100 so that the first output level of the first audio signal 1 is increased and output. Accordingly, the first audio signal 1 and the second audio signal may be output within a predetermined decibel (dB) range.

In addition, according to an embodiment, the electronic apparatus 100 may be a television (TV), and the audio device 200 may be a sound bar. However, this is only an example, and the electronic apparatus 100 may be a mobile device, and the electronic device 200 may be an external speaker, or other electronic apparatus that outputs a voice signal. In addition, the electronic apparatus 100 may be a speaker that outputs an audio signal.

Figure 2:
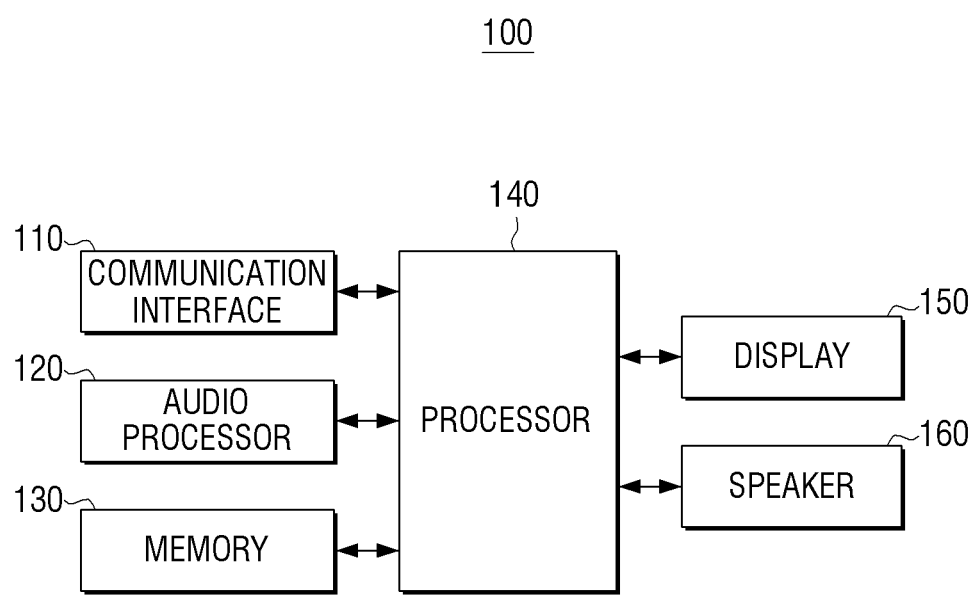
FIG. 2 is a block diagram illustrating configuration of an electronic apparatus according to an embodiment.

FIG. 2 is a block diagram is a block diagram illustrating configuration of an electronic apparatus according to an embodiment.

Referring to FIG. 2, the electronic apparatus 100 may include a communication interface 110, an audio processor 120, a memory 130, a processor 140, a display 150, and a speaker 160. The electronic apparatus 100 does not necessarily have to include all of the above-described components, and some components may be omitted.

Hereinafter, each component of the electronic apparatus 100 will be described in detail.

The communication interface 110 may perform communication with various types of external devices according to various types of communication methods. The electronic apparatus 100 may perform communication with an external device via wire or wirelessly through the communication interface 110. In this case, the external device may be separate from the electronic apparatus 100. The electronic apparatus 100 may perform communication with the external audio device 200 via wire or wirelessly through the communication interface 110.

The communication interface 110 may include various types of interfaces. For example, the communication interface 110 may include any one or any combination of High-Definition Multimedia Interface (HDMI), Optical, WiFi, Bluetooth, etc.

According to an embodiment, the electronic apparatus 100 is a source device, and may transmit an audio source to the external audio device 200 through the communication interface 110. In this case, the communication interface 110 may be HDMI, Optical, WiFi, or Bluetooth. According to another embodiment, the electronic apparatus 100 may transmit an audio source to the external audio device 200 through the communication interface 110 after receiving the audio source from an external source device (e.g., a set-top box). In this case, the communication interface 110 may be HDMI, Optical, WiFi, or Bluetooth. According to another embodiment, the electronic apparatus 100 may receive an audio source from the external audio device 200, and the external audio device 200 may receive the audio source from another external source device. In this case, the communication interface 110 may be HDMI.

The audio processor 120 may include a decoder that decodes an audio source or audio data, a renderer that generates an output signal based on the audio data decoded by the decoder and an audio encoder that generates digital audio data based on the audio data decoded by the decoder. In this case, the audio output signal generated through the renderer may be transmitted to the speaker 160 and output through the speaker 160. In addition, the digital audio data generated by the encoder may be transmitted, for example through the communication interface 110, to the external audio device 200 and output through the external audio device 200.

The memory 130 may store various programs and data required for an operation of the electronic apparatus 100. For example, the memory 130 may include a database storing the model name of the electronic apparatus 100, the specification information of hardware/software, the communication speed according to the type of the communication interface 110, the signal processing speed of each component of the electronic apparatus 100 according to the data format of input audio data, the signal processing speed regarding the audio data of the audio processor 120, etc.

The memory 130 may store at least one instruction. In addition, the processor 140 may perform the operation of the electronic apparatus 100 by executing instructions stored in the memory 130. The memory 130 may be implemented as a non-volatile memory, a volatile memory, etc. The memory 130 may be a non-transitory memory.

The processor 140 may control the overall operations of the electronic apparatus 100. Specifically, the processor 140 may control the electronic apparatus 100 by executing at least one instruction stored in the memory 130. The processor 140 according to an embodiment may include one or more of Central Processing Unit (CPU) or Micro Controller Unit (MCU), or may be defined in a corresponding term.

For example, the processor 140 may control output of the speaker 160 so that the first audio signal output from the speaker 160 is synchronized with the second audio signal output from the external audio device 200. Alternatively, the processor 140 may control the communication interface 110 to transmit a signal for synchronizing the first audio signal and the second audio signal to the external audio device 200.

In addition, the processor 140 may obtain a first processing time regarding the first audio signal and a second processing time regarding the second audio signal. In this case, the processor 140 may obtain information regarding an input format of the first audio source from the external audio device 200 through the communication interface 110, and obtain the first processing time based on the obtained information regarding the input format. In addition, the processor 140 may obtain the second processing time from the external audio device 200 through the communication interface 110. Alternatively, the processor 140 may obtain the second processing time based on model information of the external audio device 200.

In this case, the processor 140 may control output of the speaker 160 based on the first processing time and the second processing time so that a difference between the first output timing of the first audio signal and the second output timing of the second audio signal is less than a predetermined value. Alternatively, the processor 140 may control the communication interface 110 to transmit a signal to the external audio device 200. In this case, the external audio device 200 may control output of a speaker included in the external audio device 200 based on the signal transmitted from the electronic apparatus 100.

The processor 140 may obtain a delay time based on the first processing time and the second processing time. In this case, the processor 140 may control output of the speaker 160 based on the delay time so that the first audio signal or the second audio signal is output later than a predetermined time. For example, if the first processing time is less than the second processing time, the processor 140 may control output of the speaker 160 based on the delay time so that the first audio signal is output later than a first predetermined time. If the first processing time is greater than the second processing time, the processor 140 may transmit information regarding the delay time to the external audio device 200 through the communication interface 110. In this case, the external audio device 200 may control output of a speaker included in the external audio device 200 based on the transmitted information regarding the delay time so that the second audio signal is output later than a second predetermined time.

The display 150 may display various screens. For example, the display 150 may output a video signal which is synchronized with an audio signal output by the speaker 160.

The display 150 may be implemented as various types of displays such as Liquid Crystal Display (LCD), Organic Light Emitting Diodes (OLED) display, Plasma Display Panel (PDP), etc. The display 150 may include a driving circuit, a backlight unit, etc., that can be implemented in the form of a-Si thin-film transistor (TFT), low temperature poly silicon (LTPS) TFT, organic TFT (OTFT), etc. In addition, the display 150 may be implemented as a flexible display, or may be a touch screen capable of generating an input signal based on a touch input.

The speaker 160 may output an audio signal. For example, the speaker 160 may output the audio signal by vibrating according to the audio signal. For example, the speaker 160 may output audio data obtained through the communication interface 110. In addition, the output of the speaker 160 may be controlled by the processor 140. For example, the output timing of the speaker 160 may be controlled by the processor 140.

The speaker 160 may include various types of speaker modules. For example, the speaker 160 may include a woofer speaker, a mid-range speaker, and a tweeter.

In addition, the speaker 160 may be disposed at various locations of the electronic apparatus 100. For example, if the electronic apparatus 100 is a TV, the speaker 160 may be disposed at an upper side of the electronic apparatus 100. However, this is only an example, and the speaker 160 may be disposed at a lower side of the electronic apparatus 100. For example, one speaker module of the speaker 160 may be disposed at the upper side of the electronic apparatus 100 and another speaker module of the speaker 160 may be disposed at the lower side of the electronic apparatus 100. In addition, the speaker 160 may output an audio signal in various directions. For example, the speaker 160 may output an audio signal towards an upper side of the electronic apparatus 100. However, this is only an example, and the speaker 160 may output an audio signal towards a lower side or a front side of the electronic apparatus 100.

The external audio device 200 may include components corresponding to those discussed above with respect to the electronic apparatus 100. For example, the external audio device 200 may include a communication interface, an audio processor, a memory, a processor, and a speaker. In addition, each component of the external audio device 200 may correspond to the above-described electronic apparatus 100 and may be operated in the same manner. Thus, detailed description thereof will be omitted.

Figure 3:
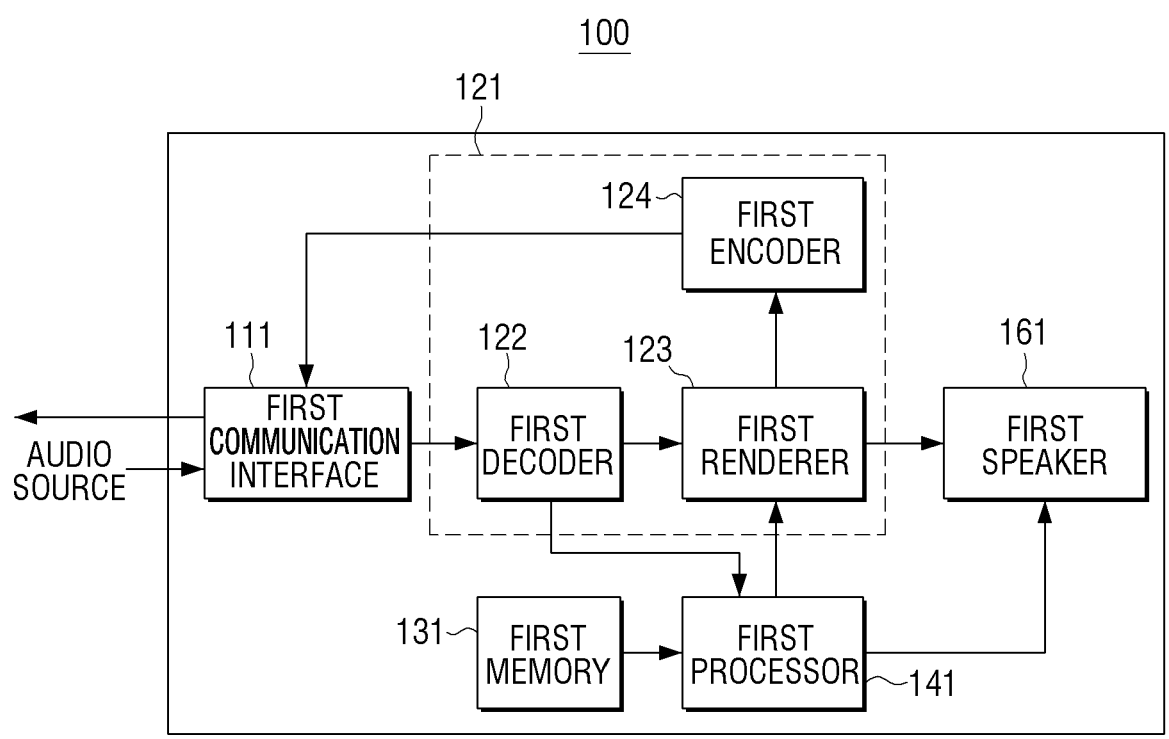
FIG. 3 is a block diagram illustrating configuration of an electronic apparatus according to an embodiment.

FIG. 3 is a block diagram illustrating configuration of an electronic apparatus according to an embodiment.

The electronic apparatus 100 may include a first communication interface 111, a first audio processor 121, a first memory 131, a first processor 141, and a first speaker 161. In addition, the first audio processor 121 may include a first decoder 122, a first renderer 123 and a first encoder 124. Each component of the electronic apparatus 100 may be operated in the same manner as the components of the electronic apparatus 100 as described in FIGS. 1 and 2 and thus, overlapping description will be omitted.

The first communication interface 111 may obtain an audio source or audio data of a content. The first decoder 122 may decode audio data obtained through the first communication interface 111. Specifically, the first decoder 122 may obtain channel setting information (e.g., PCM data) based on the audio data.

The first renderer 123 may generate an output signal based on the decoded audio data. In this case, the first renderer 123 may perform a mixing and extraction operation for generating an output signal based on the audio data. The first renderer 123 will be described in greater detail with reference to FIGS. 7 and 8.

The audio data rendered by the first renderer 123 may be output through the first speaker 161. In this case, the first processor 141 may control output of the first speaker 161. Specifically, the first processor 141 may generate a signal for controlling output of the first speaker 161 based on the audio data decoded by the first decoder 122 and reference data stored in the first memory 131. For example, the first processor 141 may obtain an input format of an audio source from the decoded audio data. In addition, the first memory 131 may store a signal processing time (e.g., a decoding time) related to the input format of the audio source. In this case, the first processor 141 may obtain a signal processing time related to the input format of the audio source based on the input format of the audio source. The first processor 141 may control an output timing of the first speaker 161 based on the obtained signal processing time. For example, if the data processing time of an external audio device that is synchronized with the electronic apparatus 100 and outputs an audio signal is greater than the data processing time of the electronic apparatus 100, the electronic apparatus 100 may control the output timing of the first speaker 161 so that an output signal is output by being delayed.

The first encoder 124 may generate digital data by encoding the audio data rendered by the first renderer 123. The generated digital data may be transmitted to another external device through the first communication interface 111. For example, the generated digital data may be transmitted to the external audio device through the first communication interface 111. In this case, the external audio device 200 may generate an output signal based on the digital data transmitted through the first communication interface 111.

Figure 4:
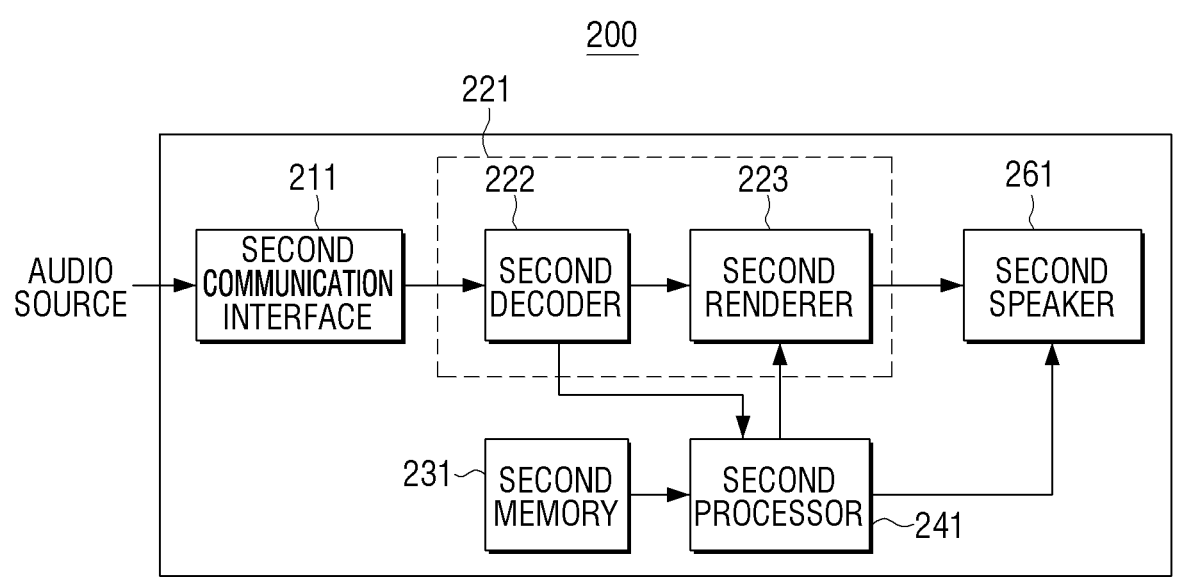
FIG. 4 is a block diagram illustrating configuration of an external audio device according to an embodiment.

FIG. 4 is a block diagram illustrating configuration of an external audio device according to an embodiment.

The external audio device 200 may include a second communication interface 211, a second audio processor 221, a second memory 231, a second processor 241, and a second speaker 261. In addition, the second audio processor 221 may include a second decoder 222, a second renderer 223 and a first encoder 224. Each component of the external audio device 200 is similar to the components of the electronic apparatus 100 described above and thus, overlapping description will be omitted.

The external audio device 200 may obtain an audio source through the second communication interface 211 and generate an output signal. In this case, the audio source obtained by the external audio device 200 may be audio data transmitted from the electronic apparatus 100.

Figure 5:
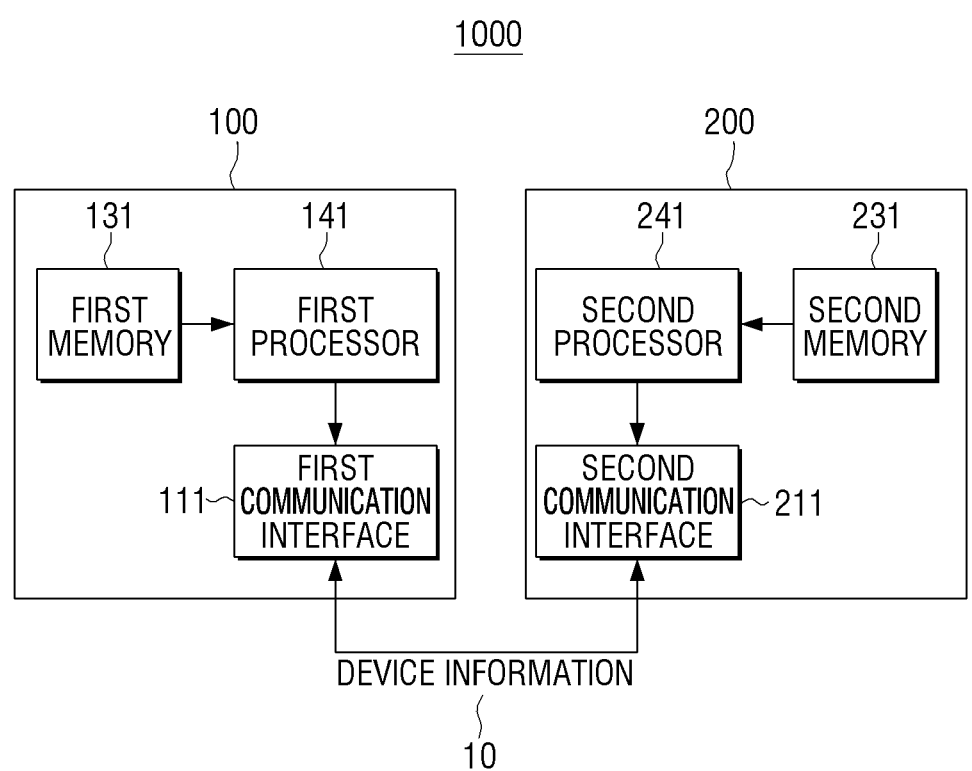
FIG. 5 is a block diagram illustrating an audio system according to an embodiment.

FIG. 5 is a block diagram illustrating an audio system 1000 according to an embodiment. The audio system 1000 may consist of the electronic apparatus 100 and the external audio device 200. The electronic apparatus 100 and the external audio device 200 may include independent processors 141, 241, respectively. Accordingly, the electronic apparatus 100 and the external audio device 200 may perform bidirectional communication, and process a signal having a higher computational amount in comparison with a single processor.

The electronic apparatus 100 may be synchronized with the external audio device 200. The electronic apparatus may exchange device information with the external audio device 200 through the first communication interface 111. In addition, the external audio device 200 may exchange device information 10 with the electronic apparatus 100 through the second communication interface 211. Based on the exchanged device information, the electronic apparatus 100 and the external audio device 200 may synchronously output an audio signal.

Here, the device information 10 may include information regarding the model names of the electronic apparatus 100 and the external audio device 200, speaker configuration, speaker output, the number of speaker channels, an audio processing method, and an audio signal processing time. For example, the device information 10 may include information regarding the audio signal processing time of each of the electronic apparatus 100 and the external audio device 200 according to an input format. In this case, the device information 10 may include information regarding the decoding time and rendering time of the electronic apparatus 100 and the external audio device 200, respectively, according to various input formats such as flac, mp3, dolby, dts, etc. For example, the input format of the audio source obtained by the electronic apparatus 100 and the signal processing time regarding the audio source of the electronic apparatus 100 may be matched with each other and stored in the first memory 131. In addition, the input format of the audio data obtained by the external audio device 200 and the data processing time for processing audio data by the external audio device 200 may be matched with each other and stored in the second memory 231.

In addition, the device information 10 may include information regarding the time required to transmit/receive data according to the type of communication interface of the electronic apparatus 100 and the external audio device 200. For example, the communication time according to various communication interfaces such as HDMI, Optical, WiFi, Bluetooth, etc. may be matched with the type information and stored in the first memory 131 and the second memory 231.

In addition, the device information 10 may include information regarding the signal processing time of the electronic apparatus 100 and the external audio device 200 and a delay time or a compensation time according to a communication interface. The above-described device information 10 may be stored in the first memory 131 and the second memory 231, respectively, in the form of a look-up table.

The electronic apparatus 100 and the external audio device 200 may control an audio output condition, respectively, based on the device information 10. For example, the electronic apparatus 100 and the external audio device 200 may control the output timing or the output level of the output audio signal based on the device information 10. For example, the electronic apparatus 100 and the external audio device 200 may control both the output timing and the output level of the output audio signal based on the device information 10.

Hereinafter, a controlling method of an electronic apparatus according to various embodiments will be described. Because the detailed operation principle of each component of the electronic apparatus 100 and the external audio device 200 has been described above, overlapping description thereof will be omitted.

Figure 6:
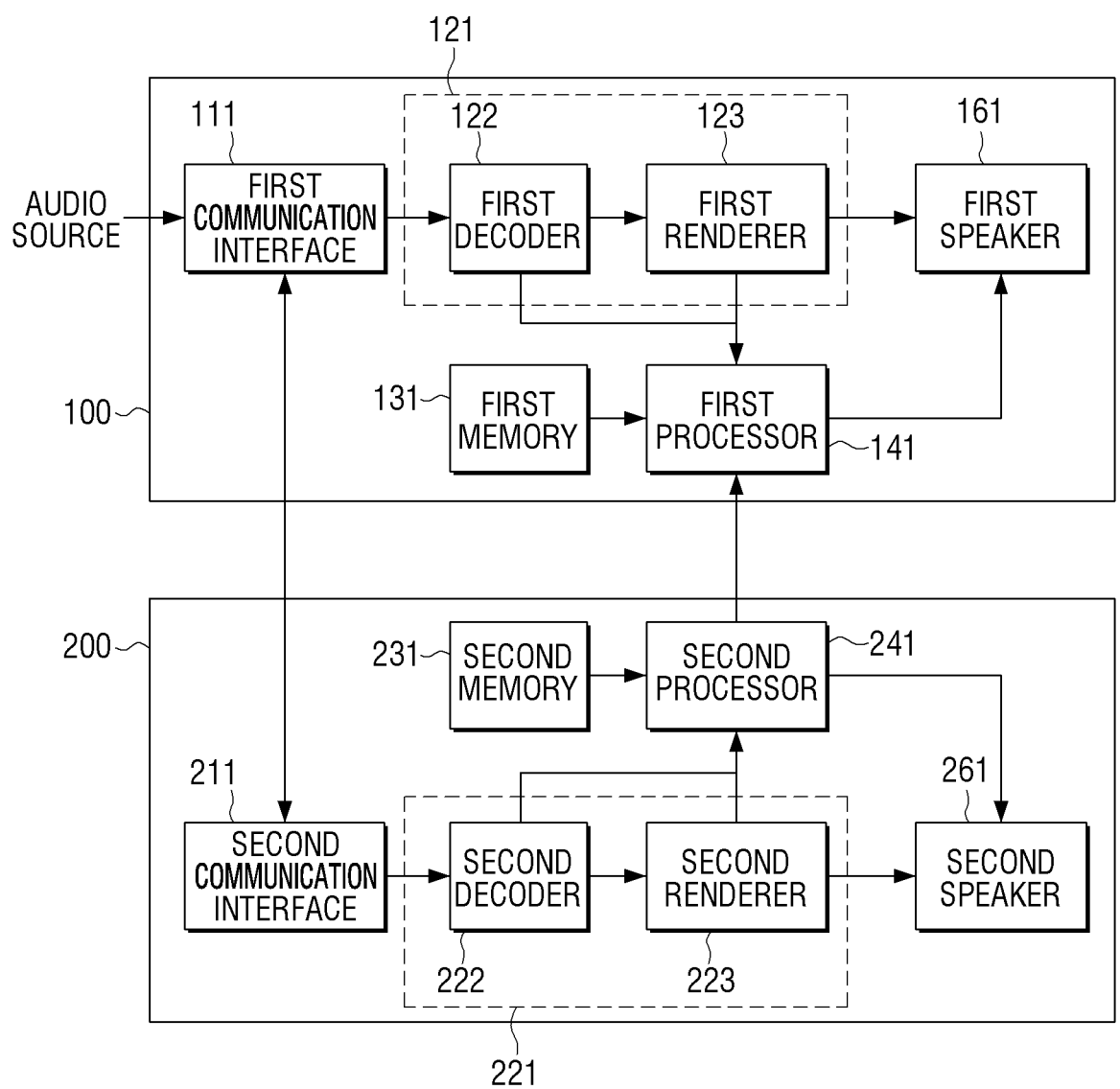
FIG. 6 is a block diagram illustrating configuration of an audio system according to an embodiment.

FIG. 6 is a block diagram illustrating configuration of an audio system according to an embodiment.

The electronic apparatus 100 may obtain an audio source through the first communication interface 111. Here, the audio source may include encoded digital audio data. The electronic apparatus 100 may decode an audio source through the first decoder 122. In addition, the electronic apparatus 100 may generate a first audio output signal through the first renderer 123. Further, the electronic apparatus 100 may output the first audio output signal through the first speaker 161.

In this case, the first processor 141 may transmit an audio source to the external audio device 200 through the first communication interface 111. The external audio device 200 may receive the audio source through the second communication interface 211. The external audio device 200 may output the second audio output signal generated through the second audio processor 221 to the second speaker 261.

The first processor 141 and the second processor 241 may control output of the first speaker 161 and the second speaker 261, respectively. For example, the first processor 141 and the second processor 241 may control the output timing and output level of the first speaker 161 and the second speaker 261, respectively.

Specifically, the first processor 141 may obtain a first processing time including a decoding time of the first decoder 122 and a first rendering time of the second renderer 223. In addition, the second processor 241 may obtain a second processing time including a second decoding time of the second decoder 222 and a second rendering time of the second renderer 223. In addition, the first processor 141 and the second processor 241 may obtain the first processing time and the second processing time by transmitting/receiving the obtained first processing time and second processing time through the first communication interface 111 and the second communication interface 211.

Based on the obtained first processing time and second processing time, the first processor 141 may control the output timing of the first speaker 161. For example, if the first processing time is less than the second processing time by more than a predetermined value, the first processor 141 may control the output timing of the first speaker 161 based on the delay time which is calculated based on the first processing time and the second processing time. The processor 141 may control the output timing of the first speaker 161 in consideration of not only the time consumed for audio processing such as decoding and rendering but also the time consumed for moving a signal in the electronic apparatus 100 and the external audio device 200.

In addition, the first processor 141 may control the output level of the first speaker 161 based on first output level information of the electronic apparatus 100 and second output level information of the external audio device 200. For example, if the first output level information is less than the second output level information by more than a predetermined value, the first processor 141 may increase the output level of the first speaker 161 based on the output compensation value that is calculated based on the first output level and the second output level, or control the first communication interface 111 to transmit a signal for decreasing the second output level to the external audio device 200.

FIG. 6 illustrates that the electronic apparatus 100 obtains an audio source and transmits the audio source to the external audio device, but this is only an example. The external audio device 200 may obtain an audio source and transmit the audio source to the electronic apparatus 100.

In addition, the electronic apparatus 100 does not necessarily have to transmit the audio source to the external audio device 200 in a state as it is obtained. In other words, the electronic apparatus 100 may transmit the audio data decoded through the first decoder 122 to the external audio device 200. In this case, the external audio device 200 may generate an output audio signal based on the decoded audio data through the second renderer 223. In this case, the decoded audio data may be transmitted to the second renderer 223 by bypassing the second decoder 222.

The electronic apparatus 100 and the external audio device 200 may have a master-slave relationship. Here, the master device may indicate a device that generates an output audio signal of each device from an audio source. For example, the master device may generate a final output audio signal for each device based on an audio source. In addition, the slave device may indicate a device that receives an output audio signal generated by the master device and outputs the output audio signal.

For example, the electronic apparatus 100 may operate as a master device, and the external audio device 200 may operate as a slave device. In this case, the electronic apparatus 100 may generate a first output audio signal output through the first speaker 161 and a second output audio signal output through the second speaker 261. In addition, the electronic apparatus 100 may transmit the generated second output audio signal to the external audio device 200. In this case, the second output audio signal transmitted to the external audio device 200 may be output through the second speaker 261 by bypassing the audio processor 221. Accordingly, the signal processing time in the second audio signal processor 221 may be reduced. In particular, when the signal processing performance of the electronic apparatus 100 is higher than the signal processing performance of the external audio device 200, the signal processing time in the external audio device 200 may be reduced and thus, the signal processing time in the entire audio system can be reduced.

In addition, the electronic apparatus 100 may operate as a slave device, and the external audio device 200 may operate as a master device. For example, if the external audio device 200 is directly connected to an external source device (e.g., a set-top box) that provides an audio source, the external audio device 200 may generate the first output audio signal output through the first speaker 161 and the second output audio signal output through the second speaker 261. In addition, the external audio device 200 may transmit the generated first output audio signal to the electronic apparatus 100. In this case, the first output audio signal transmitted to the electronic apparatus 100 may be output through the first speaker 161 by bypassing the first audio processor 121.

The master device may be a device that obtains an audio source directly, but this is only an example. The master device may receive the audio source obtained by the slave device. In this case, the master device may generate an output audio signal based on the obtained audio source and transmit the output audio signal to the slave device. For example, if the electronic apparatus 100 operates as a slave device, the electronic apparatus 100 may obtain an audio source and transmit the audio source to the external audio device 200 which is a master device. In this case, the external audio device 200 may generate the first output signal based on the transmitted audio source and transmit the first output signal to the electronic apparatus 100. The electronic apparatus 100 may output the first output signal through the first speaker 161. In particular, if the second decoder 222 of the external audio device 200 which is the master device may process various formats more than the first decoder 122 of the electronic apparatus 100 or has a better computational power, as the electronic apparatus 100 receives and outputs the first output signal generated by the external audio device 200, the signal processing time can be reduced.

The electronic apparatus 100 and the external audio device 200 may output an audio signal regarding the same content, but may output an audio signal with different audio data. For example, the electronic apparatus 100 may output a top signal, and the external audio device 200 may output a front signal.

Figure 7:
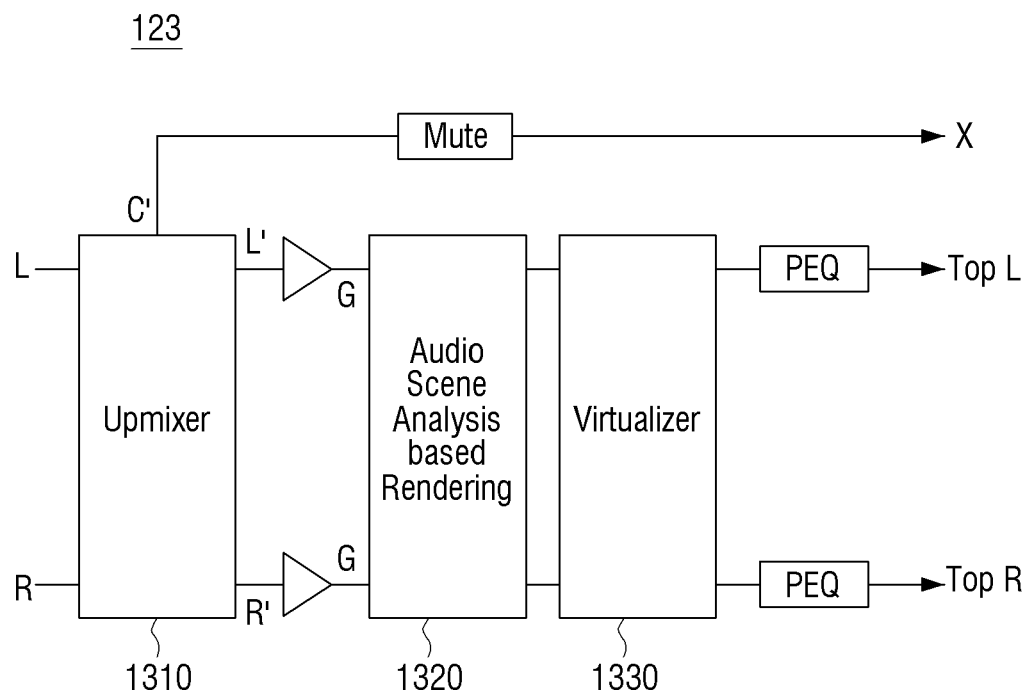
FIG. 7 is a circuit diagram of a first renderer of an electronic apparatus according to an embodiment.

FIG. 7 is a circuit diagram of a first renderer of an electronic apparatus according to an embodiment.

Referring to FIG. 7, the first renderer 123 may include an upmixer 1310, an audio scene analysis unit 1320 and a virtualizer 1330.

The upmixer 1310 may generate three signals, a center signal, a left signal and a right signal, respectively (C', L', R'), based on stereo signals (L, R). In addition, the audio scene analysis unit 1320 may analyze a content of input audio data. For example, the audio scene analysis unit 1320 may analyze a ratio of ambience/center signals, a low power factor, a ratio of harmonic signals, etc. included in the audio data. The virtualizer 1330 may adjust the sense of expansion of an audio signal. The first renderer 123 according to an embodiment may mute the center signal (C').

Figure 8:
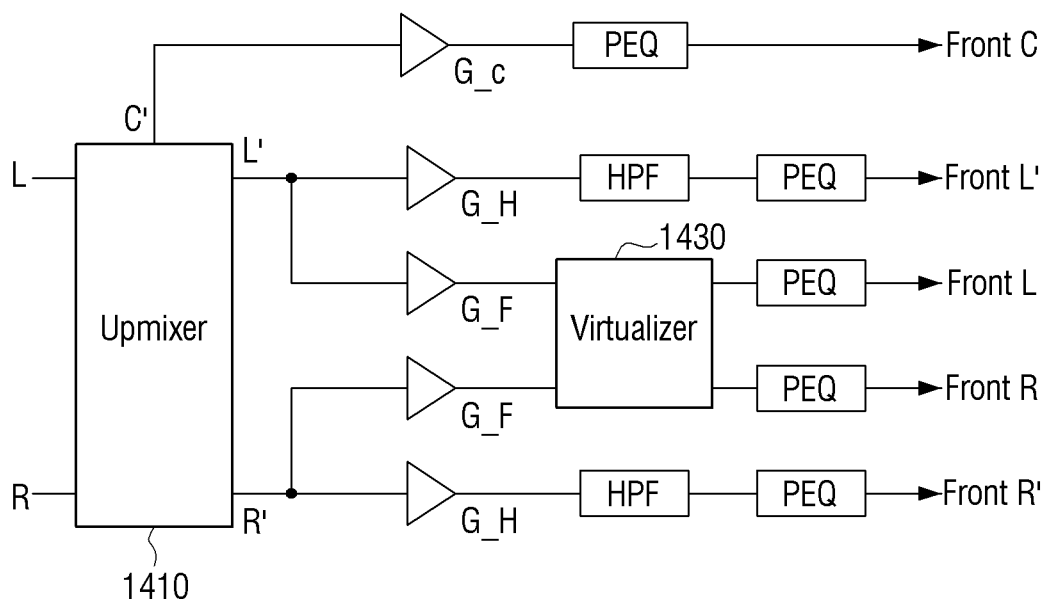
FIG. 8 is a circuit diagram of a second renderer of an external audio device according to an embodiment.

FIG. 8 is a circuit diagram of a second renderer of an external audio device according to an embodiment.

Referring to FIG. 8, the second renderer 223 may include an upmixer 1410 and virtualizer 1430. The upmixer 1410 may generate a signal of including multiple channels based on an input stereo signal. In addition, at least some of the multiple channel signals may be provided to the virtualizer 1430 in order to adjust the sense of listening of a sound field.

The first speaker 161 of the electronic apparatus 100 and the second speaker 261 of the external audio device 200 may be disposed at various locations.

Figure 9:
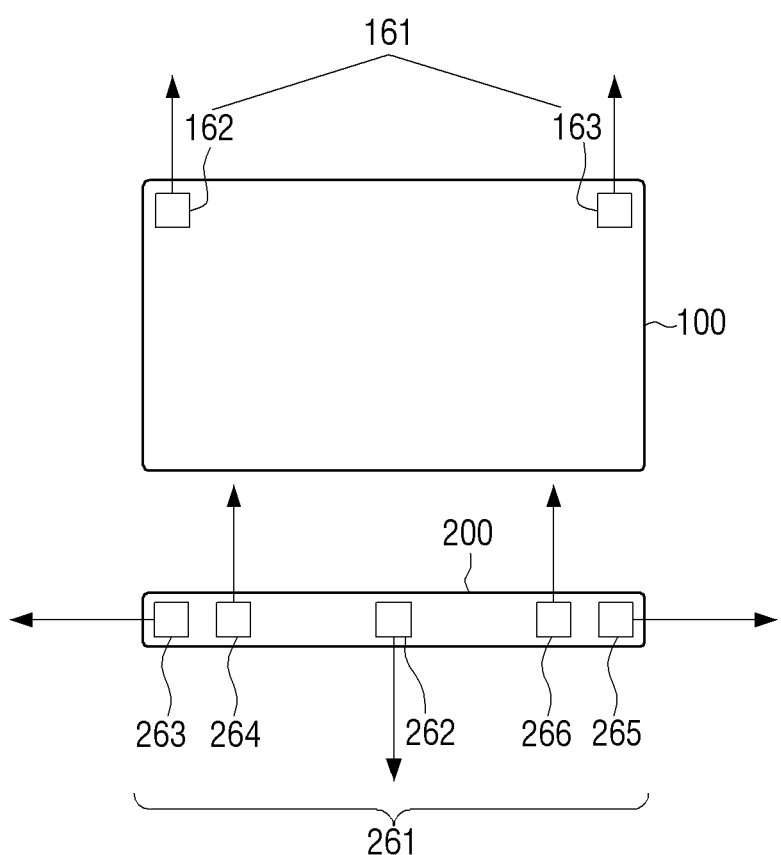
FIG. 9 is a view illustrating arrangement of a first speaker and a second speaker according to an embodiment.

FIG. 9 is a view illustrating arrangement of the first speaker 161 and the second speaker 261 according to an embodiment.

According to an embodiment, the first speaker 161 may include a first speaker module 162 and a second speaker module 163. The first speaker module 162 and the second speaker module 163 may be disposed at an upper side of the electronic apparatus 100. In this case, the first speaker module 162 and the second speaker module 163 may output an audio signal towards the upper side. In addition, each of the first speaker module 162 and the second speaker module 163 may include a speaker and a tweeter of a middle and high-pitched band.

The second speaker 261 may include a third speaker module 262, a fourth speaker module 263, a fifth speaker module 264, a sixth speaker module 265, and a seventh speaker module 266. In this case, the third speaker module 262 may be positioned at the center of the external audio device 200, and output an audio signal towards the front side. The fourth speaker module 263 and the sixth speaker module 265 may be positioned at opposite sides along the longitudinal direction of the external audio device 200, and output audio signals towards the sides of the external audio device 200. The fifth speaker module 264 and the seventh speaker module 266 may be disposed to output an audio signal towards the upper side. In addition, each of the third speaker module 262, the fourth speaker module 263, the fifth speaker module 264, the sixth speaker module 265, and the seventh speaker module 266 may include a speaker, a tweeter and a woofer speaker of a middle and high-pitched band. However, this is only an example, and the number of speakers included in the second speaker 261 may vary.

FIG. 9 illustrates an example arrangement of the speakers included in the first speaker 161 and the second speaker 261. However, embodiments are not limited to the arrangement or the directions shown in FIG. 9.

The frequency component of the first audio signal output from the electronic apparatus 100 may be different from the frequency component of the second audio signal output from the external audio device 200.

Figure 10:
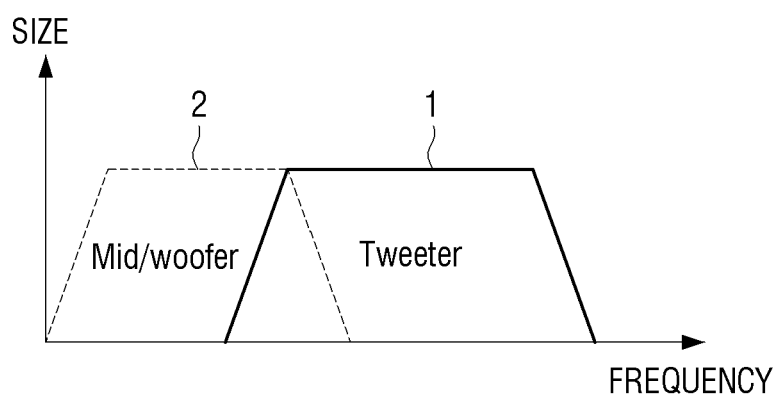
FIG. 10 is a graph illustrating frequency characteristics of an audio signal according to an embodiment.

FIG. 10 is a graph illustrating frequency characteristics of an audio signal according to an embodiment.

Referring to FIG. 10, the first audio signal 1 may be an audio signal in a high-pitched band, and the second audio signal 2 may be an audio signal in a middle or low-pitched band. In this regard, if it is difficult for the electronic apparatus 100 to output an audio signal of a middle or low-pitched band, the external audio device 200 may output an audio signal of a middle or low-pitched band. Accordingly, a user may listen to an audio signal of a middle or low-pitched band as well as an audio signal of a high-pitched band, experiencing a broader sound stage.

The diverse embodiments described above may be implemented in a computer or an apparatus similar to the computer using software, hardware, or a combination of software and hardware. In some cases, embodiments described in the disclosure may be implemented by a processor itself. According to a software implementation, embodiments such as procedures and functions described in the specification may be implemented by separate software modules. Each of the software modules may perform one or more functions and operations described in the disclosure.

Computer instructions for performing processing operations according to the diverse embodiments of the disclosure described above may be stored in a non-transitory computer-readable medium. The computer instructions stored in the non-transitory computer-readable medium cause a specific device to perform the processing operations of the display apparatus according to the diverse embodiments described above when they are executed by a processor of the specific device.

The non-transitory computer-readable medium is a medium that semi-permanently stores data and is readable by the device. Specific examples of the non-transitory computer-readable medium may include a compact disk (CD), a digital versatile disk (DVD), a hard disk, a Blu-ray disk, a USB, a memory card, a ROM, and the like.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic apparatus comprising:
a communication interface;
a display;
an internal speaker; and
a processor configured to:
    obtain a first processing time regarding a first audio signal output by the internal speaker based on first model information of the electronic apparatus, and a second processing time regarding a second audio signal output by an external audio device based on second model information of the external audio device;
    obtain a difference value between the first processing time and the second processing time; and
    control the internal speaker to output the first audio signal or control the communication interface to transmit a control signal to the external audio device so that the first audio signal or the second audio signal is offset based on the first processing time and the second processing time.

2. The electronic apparatus as claimed in claim 1, wherein the first audio signal and the second audio signal are provided from a common source.

3. The electronic apparatus as claimed in claim 1, wherein the processor is further configured to generate a second audio source of the second audio signal by decoding a first audio source of the first audio signal.

4. The electronic apparatus as claimed in claim 1, wherein the processor is further configured to generate a second audio source of the second audio signal by rendering a first audio source of the first audio signal.

5. The electronic apparatus as claimed in claim 1, wherein a second audio source of the second audio signal comprises a frequency component that is not provided in the first audio signal.

6. The electronic apparatus as claimed in claim 1, wherein the processor is further configured to obtain the first processing time based on an input format of a first audio source corresponding to the first audio signal from the external audio device through the communication interface.

7. The electronic apparatus as claimed in claim 1, wherein the processor is further configured to obtain model information of the external audio device from the external audio device through the communication interface, and obtain the second processing time based on the model information.

8. The electronic apparatus as claimed in claim 1, wherein the processor is further configured to:
based on the difference value being greater than the predetermined value, obtain a delay time based on the first processing time and the second processing time; and
control output of the internal speaker or control the communication interface to transmit the signal to the external audio device so that the first audio signal or the second audio signal is offset based on the delay time.

9. The electronic apparatus as claimed in claim 8, wherein the processor is configured to, based on the first processing time being less than the second processing time, control output of the internal speaker so that the first audio signal is offset by the delay time so that the first audio signal is output later than a first predetermined time.

10. The electronic apparatus as claimed in claim 8, wherein the processor is configured to, based on the first processing time being greater than the second processing time, control the communication interface to transmit the signal for controlling the second audio signal to be offset by the delay time so that the second audio signal is output later than a second predetermined time, to the external audio device.

11. A method of controlling an electronic apparatus including an internal speaker and a communication interface connected to an external audio device, the method comprising:
obtaining a first processing time regarding a first audio signal output from the internal speaker based on first model information of the electronic apparatus and a second processing time regarding a second audio signal output from the external audio device based on second model information of the external audio device;
obtaining a difference value between the first processing time and the second processing time; and
controlling the internal speaker to output the first audio signal or controlling the communication interface to transmit a control signal to the external audio device so that the first audio signal or the second audio signal is offset based on the first processing time and the second processing time.

12. The method as claimed in claim 11, wherein the obtaining the first processing time and the second processing time comprises:
obtaining the first processing time based on an input format of a first audio source corresponding to the first audio signal from the external audio device.

13. The method as claimed in claim 11, wherein the obtaining the first processing time and the second processing time comprises:
obtaining model information of the external audio device from the external audio device; and
obtaining the second processing time based on the obtained model information.

14. The method as claimed in claim 11, further comprising:
based on the difference value being greater than the predetermined value, obtaining a delay time based on the first processing time and the second processing time; and
based on the first processing time being less than the second processing time, controlling output of the internal speaker so that the first audio signal is offset based on the obtained delay time.

15. The method as claimed in claim 11, wherein the first audio signal and the second audio signal are provided from a common source.

16. The method as claimed in claim 11, wherein a second audio source of the second audio signal comprises a frequency component that is not provided in the first audio signal.

17. An audio system, comprising:
a first electronic apparatus comprising a display, a first communication interface, a first memory, and a first speaker;
a second electronic apparatus comprising a second communication interface, a second memory and a second speaker; and
a processor configured to:
obtain a first processing time of the first electronic apparatus based on first model information of the first electronic apparatus stored in the first memory;
obtain a second processing time of the second electronic apparatus based on second model information of the second electronic apparatus stored in the second memory;
obtain a difference the first processing time and the second processing time; and
based on the difference between the first processing time and the second processing time being greater than a predetermined value, obtain a delay time based on the first processing time and the second processing time, and control at least one of the first electronic apparatus or the second electronic apparatus to output an audio signal based on the delay time.

18. The audio system as claimed in claim 17, wherein the processor is configured to:
control a first audio signal output through the first speaker so that the first audio signal is offset by the delay time, based on the first processing time being less than the second processing time; and
control a second audio signal output through the second speaker so that the second audio signal is offset by the delay time, based on the first processing time being greater than the second processing time.

19. An apparatus comprising:
a first communication interface;
a second communication interface; and
a processor configured to:
obtain a first processing time corresponding to a first audio signal output through the first communication interface based on first model information of a first device;
obtain a second processing time corresponding to a second audio signal output through the second communication interface based on second model information of a second device;

obtain a difference between the first processing time and the second processing time;

identify whether the difference between the first processing time and the second processing time is greater than a threshold value; and delay one from among the first audio signal and the second audio signal based on the difference being greater than the threshold value.

20. The apparatus as claimed in claim 19, wherein the processor is further configured to obtain generate a first audio source and a second audio source based on an input audio source;

provide the first audio source to the first device through the first communication interface;

provide the second audio source to the second device through the second communication interface;

obtain first model information of the first device and second model information of the second device;

obtain the first processing time based on a format of the input audio source and first model information corresponding to the first device; and obtain the second processing time based on the format of the input audio source and second model information corresponding to the second device.

* * * * *